US007663596B2

(12) United States Patent
Nam et al.

(10) Patent No.: US 7,663,596 B2
(45) Date of Patent: Feb. 16, 2010

(54) TRANS-REFLECTIVE LIQUID CRYSTAL DISPLAY DEVICE FOR IMPROVING COLOR REPRODUCIBILITY AND BRIGHTNESS AND METHOD FOR DRIVING THEREOF

(75) Inventors: Mi-Sook Nam, Gyeonggi-Do (KR); Sang-Min Jang, Anyang (KR); Su-Seok Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 564 days.

(21) Appl. No.: 10/733,401

(22) Filed: Dec. 12, 2003

(65) Prior Publication Data

US 2004/0119676 A1 Jun. 24, 2004

(30) Foreign Application Priority Data

Dec. 13, 2002 (KR) .................... 10-2002-0079826

(51) Int. Cl.
*G09G 3/36* (2006.01)
(52) U.S. Cl. .................. 345/102; 349/68; 349/114
(58) Field of Classification Search .................. 345/87, 345/88, 102; 349/1, 67, 68, 113, 114, 115; 359/71
See application file for complete search history.

(56) References Cited

U.S. PATENT DOCUMENTS

| 6,195,140 | B1 | 2/2001 | Kubo et al. | |
|---|---|---|---|---|
| 6,642,916 | B1* | 11/2003 | Kodama et al. | ............. 345/100 |
| 7,092,062 | B2* | 8/2006 | Ozawa | .................... 349/152 |
| 7,262,754 | B1* | 8/2007 | Yamazaki | .................... 345/87 |
| 2002/0171792 | A1* | 11/2002 | Kubota et al. | ............. 349/114 |
| 2003/0160920 | A1* | 8/2003 | Ha et al. | .................... 349/113 |
| 2004/0145691 | A1* | 7/2004 | Kubota et al. | ............. 349/114 |
| 2005/0088403 | A1* | 4/2005 | Yamazaki | .................... 345/102 |
| 2005/0195346 | A1* | 9/2005 | Maeda et al. | ............. 349/114 |
| 2006/0152658 | A1* | 7/2006 | Ozawa et al. | ............. 349/114 |

FOREIGN PATENT DOCUMENTS

JP 2000111910 A * 4/2000

* cited by examiner

*Primary Examiner*—Amr Awad
*Assistant Examiner*—Stephen G Sherman
(74) *Attorney, Agent, or Firm*—McKenna Long & Aldridge

(57) ABSTRACT

The trans-reflective liquid crystal display device of this invention includes a plurality of data and gate lines defining a plurality of pixels, the pixels having a reflection region and a transmission region; a timing controller that receives, converts, and outputs image data; a switching unit that determines the output signal of the timing controller according to a transmission mode or reflection mode; a gate driver that receives a gate signal from the timing controller; a data driver that receives a data signal from the timing controller; a liquid crystal display panel with a TFT array substrate and a color filter substrate, the liquid crystal display panel displaying the image according to a gate pulse and a data voltage applied by the gate driver and the data driver; a sequential backlight including red, green, and blue lamps wherein, the backlight is turned on in a transmission mode to sequentially transmit the light into the transmission region and is turned off in a reflection mode.

16 Claims, 5 Drawing Sheets

TRANS-REFLECTIVE LIQUID CRYSTAL DISPLAY DEVICE FOR IMPROVING COLOR REPRODUCIBILITY AND BRIGHTNESS AND METHOD FOR DRIVING THEREOF

This application claims the benefit of Korean Patent Application No. 2002-79826, filed on Dec. 13, 2002, which is hereby incorporated by reference for all purposes as if fully set forth herein.

BACKGROUND OF THE INVENTION

1. Field of the Invention

The present invention relates to a trans-reflective liquid crystal display device, more particularly to the trans-reflective liquid crystal display device in which the brightness may be improved by using sequential backlight in reflection mode and transmission mode.

2. Description of the Related Art

Generally, a liquid crystal display device LCD realizes an image by modulating the light emitted from a light source called a backlight disposed at the rear or one side of a liquid crystal display device panel. Because only a small quantity of the light passes through the liquid crystal display panel, the power consumption of the backlight may be increased.

In order to decrease the power consumption of LCD displays, a reflective liquid crystal display device has been introduced. In the reflective liquid crystal display device, there is no need for a backlight, because external light is used to display the images. This means the power consumption may be decreased in the reflective liquid crystal display device and as a result, this device may be suitable for portable display devices.

The reflective liquid crystal display device is provided with reflective opaque materials to reflect the external light.

Because external light such as natural light or artificial light is not always available, the reflective liquid crystal display device may be used only where natural light or artificial light is available.

Accordingly, to overcome this problem, a trans-reflective liquid crystal display device having the advantages of transmissive and reflective liquid crystal display devices has been studied. The trans-reflective liquid crystal display device may be used as a transmission mode display device or a reflection mode display device.

Generally, because the trans-reflective liquid crystal display device has transmission and reflection modes, it is possible to use both the backlight and the external light as a light source. It has the advantage of reducing the power consumption in the trans-reflective liquid crystal display device as compared to a transmissive backlight liquid crystal display.

Referring to FIG. 1, a related art trans-reflective liquid crystal display device includes a thin film transistor TFT array substrate 105 on which a plurality of switching elements such as TFTs are formed, a color filter substrate on which color filters are formed, and a liquid crystal layer interposed between the TFT array substrate 105 and color filter substrate.

The TFT array substrate 105 includes a plurality of TFTs, formed on a first transparent substrate 100. The TFTs are each arranged in a pixel to apply a voltage signal to the liquid crystal layer. On the TFT array substrate 105, a gate insulator layer 110, an organic layer 120, a reflection electrode 130, a passivation layer 140 and a pixel electrode 150 are formed sequentially. A backlight is disposed to the rear of the TFT array substrate 105 or under the TFT array substrate 105 to emit the light to the TFT array substrate. Each pixel formed in the trans-reflective LCD panel may be divided into a reflection region and a transmission region. At this time, the reflection electrode is formed only in the reflection region.

The color filter substrate 165 includes a color filter 180 on the second transparent substrate 160 to display color when the light passes through the color filter layer 180. The color filter layer 180 comprises red, green or blue sub layers which are divided by a black matrix (not shown) from each other.

In the transmission mode, the light emitted from the backlight passes sequentially through the TFT array substrate 105, liquid crystal layer 190 and the color filter substrate 165 as shown by a solid line arrow in the FIG. 1.

In the reflection mode, the external light incident on the color filter substrate 165 passes through the liquid crystal layer 190 and then is reflected by the reflection electrode 130. Therefore, the reflected light is then emitted through the liquid crystal layer 190 and the color filter substrate 165 as a dotted line arrow in FIG. 1.

The light passes through the color filter layer 180 twice in the reflection mode, and the light passes through the color filter layer only once in the transmission mode. Because the light path through the color filter 180 is different in the transmission region and reflection region, the color purity is also different in the transmission and reflection modes.

The nonuniformity of the color purity causes the color of the trans-reflective LCD device to deteriorate. This nonuniformity of the color purity may be compensated by a color filter layer with a transmission region having a thickness that is twice the thickness of the color filter layer in the reflection region.

There are two methods used for forming the color filter layer having a thickness difference in the transmission and reflection regions. One method is to form a transparent organic layer 170 in the reflection region on the second transparent substrate 160 and then to form the color filter layer 180 on the transparent organic layer 170 and transmission region. Thus, the thickness of the color filter layer in the transmission region may be increased according to the thickness as the organic layer 170.

The other method is to etch the second transparent substrate 160 in the transmission region and then to form the color layer on the second transparent substrate 160. By this etching, the thickness of the color filter layer in the transmission region may be increased based upon the depth of the etched substrate.

In the above methods, however, the fabricating process is complicated. In the transmission mode, the light has to pass through the thick color filter 180, so that the transmission ratio and the brightness is lower.

In addition, if the area of the transmission region is increased to improve the brightness in transmission mode, the brightness may be decreased in reflection mode.

SUMMARY OF THE INVENTION

Accordingly, the present invention is directed to the trans-reflective liquid crystal display device of which the brightness is improved in both transmission and reflection modes.

An advantage of the present invention is to provide a trans-reflective liquid crystal display device increasing the color reproducibility and the brightness. The trans-reflective liquid crystal display device includes a plurality of data and gate lines defining a plurality of pixels, the pixels having a reflection region and a transmission region; a timing controller that receives, converts, and outputs image data; a switching unit that determines the output signal of the timing controller according to a transmission mode or reflection mode; a gate driver that receives a gate signal from the timing controller; a data driver that receives a data signal from the timing controller; a liquid crystal display panel with a TFT array substrate and a color filter substrate, the liquid crystal display panel displaying the image according to a gate pulse and a data voltage applied by the gate driver and the data driver; a sequential backlight including red, green, and blue lamps wherein, the backlight is turned on in a transmission mode to sequentially transmit the light into the transmission region and is turned off in a reflection mode.

The color filter layer may be formed only on the reflection region of the color filter substrate.

Another advantage of the present invention is to provide the backlight controller to control the emitting timing of the light, which is connected to the sequential backlight when the LCD is operated as a transmission mode.

The data driver may include a MUX circuit shorting the adjacent three data lines, wherein the MUX circuit is turned on in transmission mode and turned off in reflection mode.

The sequential backlight may include of three kinds of emitting diode, red, green, blue.

The cell gap between the TFT substrate and the color filter substrate may be twice in the transmission region than in the reflection region.

Another embodiment of the present invention includes a method of providing a trans-reflective liquid crystal display device including a plurality of pixel regions defined by the plurality of data lines and the plurality of gate lines arranged to cross with the plurality of data line to increase the color reproducibility and the brightness, wherein each of the plurality of pixel region includes a reflection region and a transmission region, comprises the step of inputting the image data to the timing controller, selecting the transmission mode or reflection mode by a switching part, changing and outputting the image data by the timing controller when the transmission mode is selected and realizing the color by compounding the external light passing through the red, green and blue color filter layer which is formed on the each transmission region of three adjacent pixel.

Each frame may be divided to three sub flames to which red, blue, and green light is irradiated.

The same data voltage may be applied to three adjacent pixels in every sub frame to simplify the driving circuit.

Thus, the invention simplifies the fabricating method of color filter substrate, because the color filter layer is not formed in the transmission region, and increases the brightness in the reflection mode as well as transmission mode.

Additional features and advantages of the invention will be set forth in the description which follows, and in part will be apparent from the description, or may be learned by practice of the invention.

The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
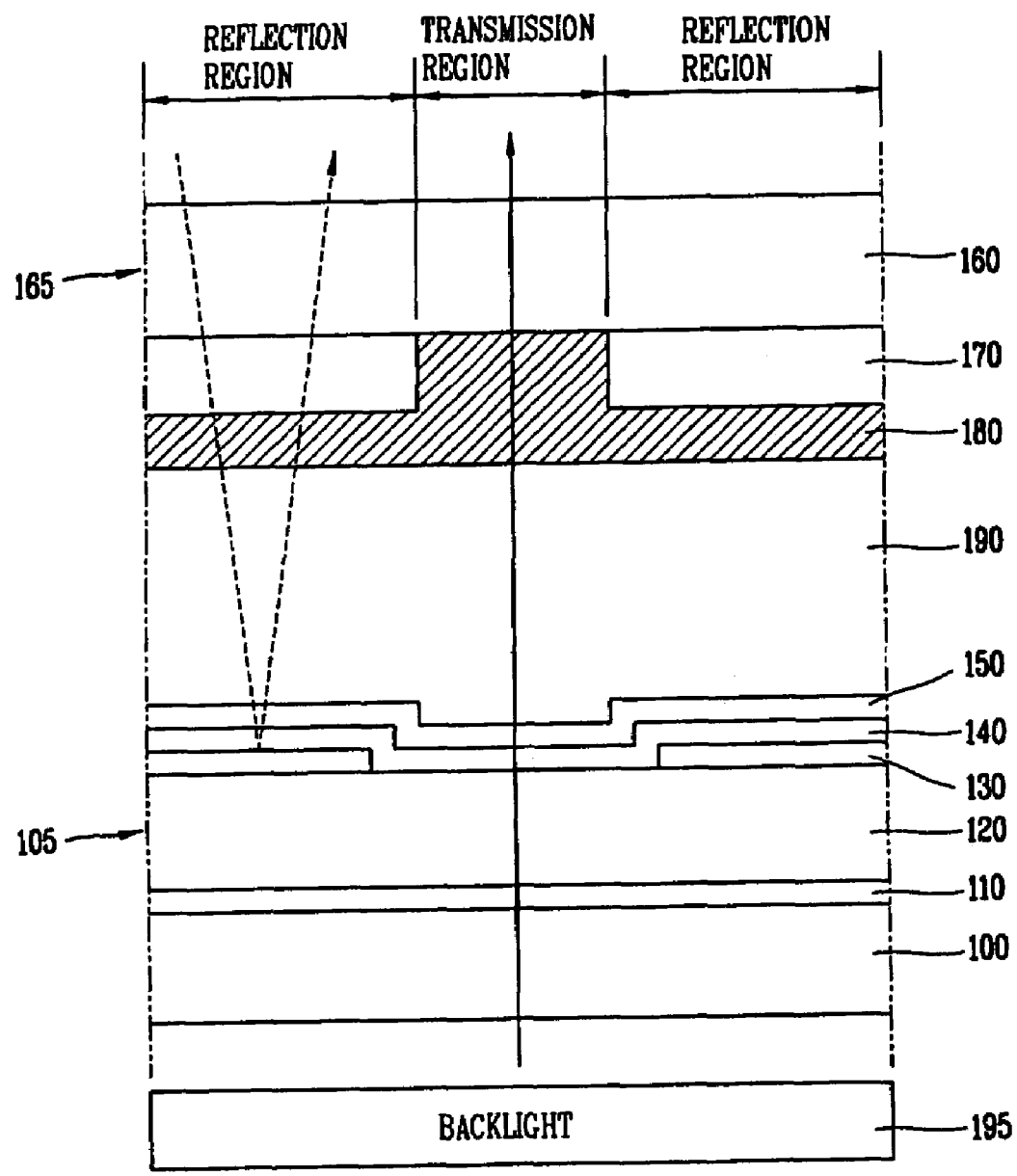
FIG. 1 is a partial sectional view of the related art trans-reflective liquid crystal display device.
Figure 2:
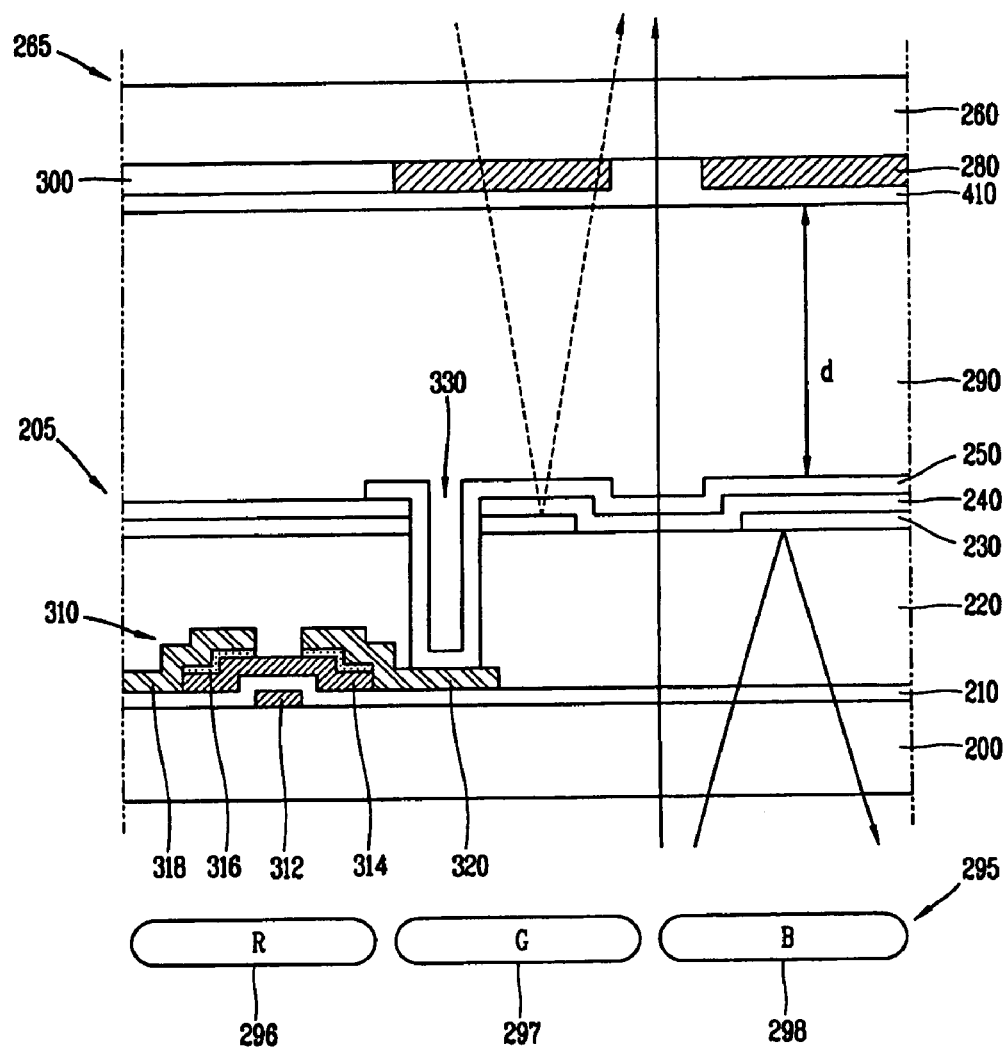
FIG. 2 is a sectional view of the trans-reflective liquid crystal device according to a first embodiment of the present invention.

FIG. 2 is a sectional view of the trans-reflective liquid crystal display device according to one embodiment of the present invention. As shown in FIG. 2, the TFT array substrate 205 and color filter substrate 265 are attached each other in the predetermined cell gap d, the liquid crystal layer 290 is interposed therebetween. Behind or under the TFT array substrate 205, a sequential backlight supplies light into the liquid crystal layer 290.

In the TFT array substrate 205, the TFT 310 applies the signal voltage to the pixel electrode arranged in each pixel region on the first transparent substrate 200.

The TFT 310 includes the gate electrode 312 that receives the gate signal from an outer driver (not shown in figure), the semiconductor layer 314 forming a channel which is activated according to the applied gate signal, a N+ doping layer 316 on the both sides of the semiconductor layer 314, a gate insulating layer 210 insulating the semiconductor layer 314 and the gate electrode 312, a source electrode 318 on the N+ doping layer 316 to which the data signal is applied from the outer driver (not shown in figure) and a drain electrode 320 applying the data signal to the pixel electrode 250.

In addition, an organic layer 220 is formed on the TFT 310 to protect the source electrode 318 and drain electrode 320. Though this organic layer 220 may be formed with inorganic material, the organic material is preferable because of the higher aperture ratio. On the organic layer 220, a reflection electrode 230 made of a metal having a high reflection ratio is formed. Further, a passivation layer 240 is formed on the whole area of the substrate 200 The organic layer 220, the reflection electrode 230, and the passivation layer 240 are etched to form a contact hole 330 through which the drain electrode 320 and the pixel electrode 250 are connected each other.

In color filter substrate 265, the black matrix 300 is formed on the boundary region of each pixel on the second transparent substrate 260. Further, the sub color filter layer of red, green and blue is coated on the second transparent substrate 260. At that time, the sub-color filter layers 280 are formed only in the reflection region. That is, the sub-color filter layers are not formed in the transmission region.

In this invention, it is not necessary to form the additive organic layer or to etch the substrate to make the color filter layer. Therefore, the fabrication process of the color filter substrate may be simplified.

The common electrode 410 such as ITO (Indium Tin Oxide) is formed on the sub-color filter layer 280 to apply electric field into the liquid crystal layer 290 with the pixel electrode 250. An overcoat layer (not shown) may be formed to protect the color filter layer and to form the uniform thickness of the layers.

The sequential backlight 295 emits the red, green and blue light according to a predetermined order toward the liquid crystal display panel. The sequential backlight includes red 296, green 297 and blue-lamps 298 emitting red, green and blue light. The lamps 296, 297, and 298 may be light emitting diodes (LED).

Unlike the related art backlight that emits white light, a color filter in the transmission region is not necessary in the present invention, because the sequential backlight of this invention emits light having colors corresponding to the color filter colors. Because the color filter layer is not formed in the transmission region, the transmission ratio and the brightness may be improved. Because the brightness of the light from the lamps 296, 297, 298 in the sequential backlight is greater than that of natural light, it is possible to compensate the aperture ratio in the case where the area of the reflection region is larger than that of transmission region. In this invention, therefore, the aperture ratio and brightness in the reflection mode may be increased.

Hereinafter, the operation of the trans-reflective LCD device will be described in detail.

Because the liquid crystal display device of this invention uses external light in the reflection mode, the sequential backlight is turned off. The external light passes through the color filter substrate 265 and the liquid crystal layer 290 and then is reflected by the reflection electrode 230 on the TFT array substrate 205. The reflected light is emitted from the LCD panel through the liquid crystal layer 290 and the color filter substrate 265. In this mode, colors are realized when the light passes through the color filter 280. In FIG. 2, the path of the reflected external light is indicated as dotted line.

In transmission mode, the sequential backlight 295 is turned on. Accordingly, the light from the sequential backlight is emitted from the LCD panel through the TFT array substrate 205, the liquid crystal layer 290, and the transmission region of color filter substrate 265. Though the color filter 280 is not formed in the transmission region, the colors are realized by the lamps 296, 297, 298 emitting the corresponding colors. At this time, the light transmitted to the reflection region from the backlight is blocked by the reflection electrode 230, so that the external light cannot pass through the liquid crystal layer. In FIG. 2, the path of the light in transmission mode is indicated as a solid line.

Figure 3:
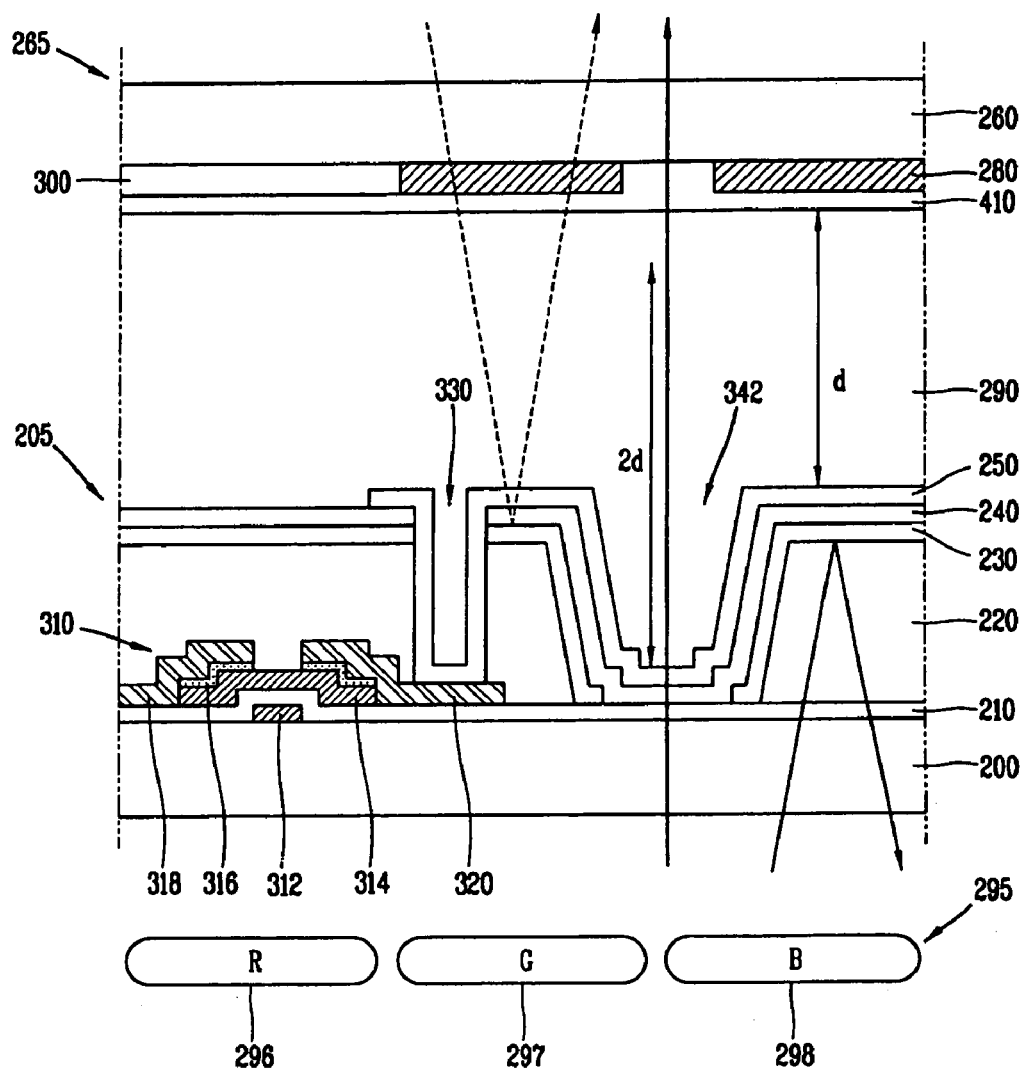
FIG. 3 is a sectional view of the trans-reflective liquid crystal device according to a second embodiment of the present invention.

FIG. 3 is a sectional view of the trans-reflective liquid crystal display device according to a second embodiment of the present invention. At this time, explanation for any structure that was the same as for the first embodiment (i.e., any element with the same reference number) will be omitted for convenience.

In the second embodiment as shown in FIG. 3, the organic layer 220 is etched to form a transmission hole 342. A sidewall of the transmission hole 342 is slanted to deposit a pixel electrode easily in the hole. The transmission hole 342 is formed in a transmission region. Thus, in the reflection mode, the incident light is reflected by the reflection electrode 230 and then emitted from the LCD panel. In the transmission mode, however, the light from the sequential backlight 295 is transmitted only through transmission hole 342 to display the image.

In theory, the ratio of the cell gap of the transmission and reflection regions may be 2:1 in order to identify the transmission ratio between the two regions. By the transmission hole, in this embodiment, the ratio of the cell gap of the transmission and reflection regions may be approximately 2:1 and as a result the transmission ratio in the transmission mode may be improved.

In this embodiment, the operation of LCD in the transmission and in reflection modes is substantially same except for the path of the light.

Figure 4:
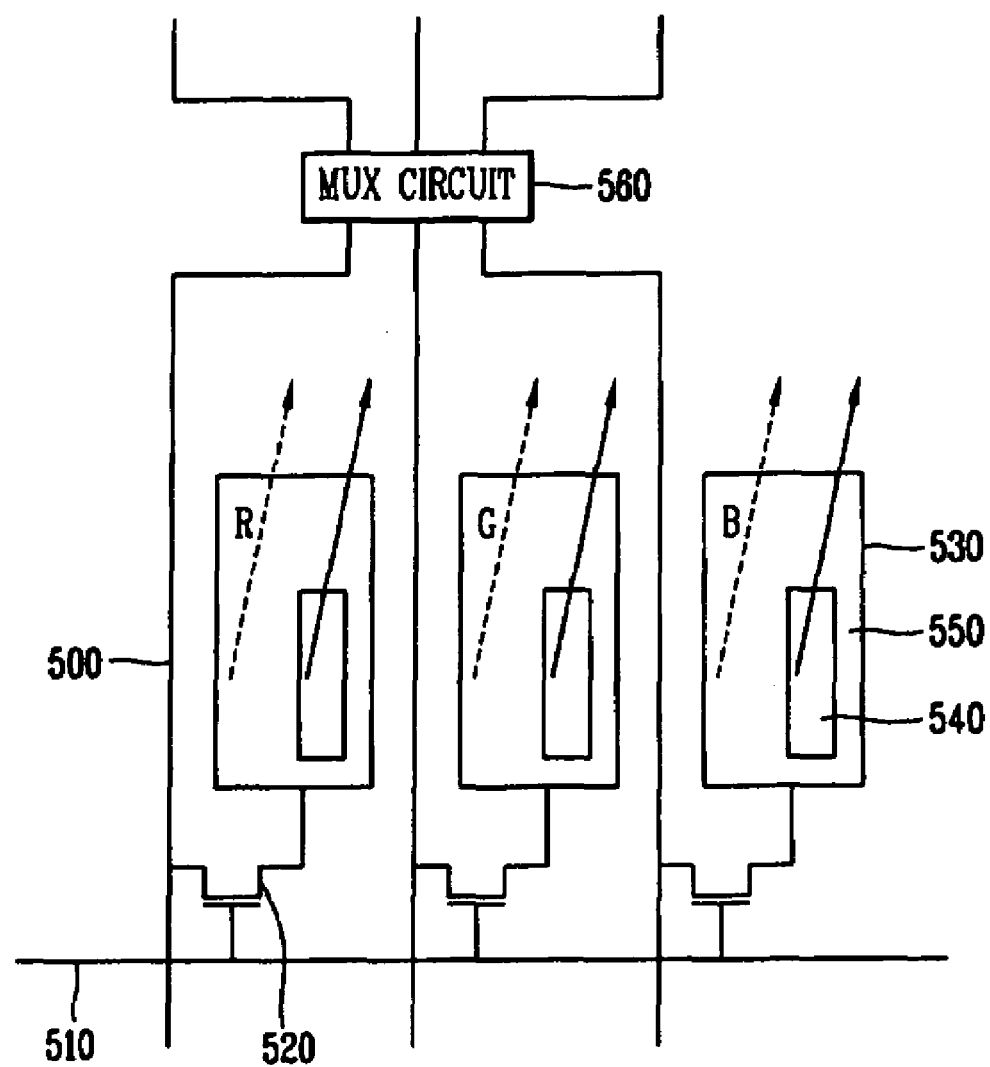
FIG. 4 is a drawing showing a pixel structure of the trans-reflective liquid crystal display device according to the present invention.

FIG. 4 is a plan view showing a part of the trans-reflective liquid crystal display device according to this invention. In this figure, only the adjacent 3 pixels, i.e., red, green and blue pixels are shown.

As shown in FIG. 4, a plurality of data lines 500 and gate lines 510 are respectively arranged in the transverse and longitudinal directions to define a plurality of pixel areas and the TFT 520 as a switching device is disposed at the intersection of the gate line and data line. The pixel electrode 530 is formed in each pixel area to be connected to the TFT 520 electrically. The pixel electrode 530 is divided into the transmission region 540 and reflection region 550. In the reflection region, the reflection electrode is formed under the pixel electrode 530. The light passes through the transmission region 540 (shown as a solid line in FIG. 4) in the transmission mode and the light passes through the reflection region 550 (shown as a dotted line in FIG. 4) in the reflection mode.

As shown in FIG. 4, 3 data lines 500 connected to the TFTs at the adjacent 3 pixels R, G, and B are connected to a timing controller (not shown) through a multiplex (MUX) circuit 560. The MUX circuit 560 may be formed between the timing controller (not shown) and data line 500. Further, the MUX circuit 560 may be integrated with the timing controller. In the transmission mode, the MUX circuit 560 is turned on to apply the same data signal to the adjacent 3 pixels (R, G, B). The MUX circuit 560 is and turned off in the reflection mode and applies the individual data signals to the adjacent 3 pixels (R, G, B).

In the transmission mode, colors are realized by emitting sequentially light having R, G, B colors during a short period of time. On the other hand, in the reflection mode, the colors are realized by transmitting the light through the 3 sub-color filter. That is, time resolution is used to display the color in the transmission mode while the spatial resolution is used in the reflection mode.

Figure 5:
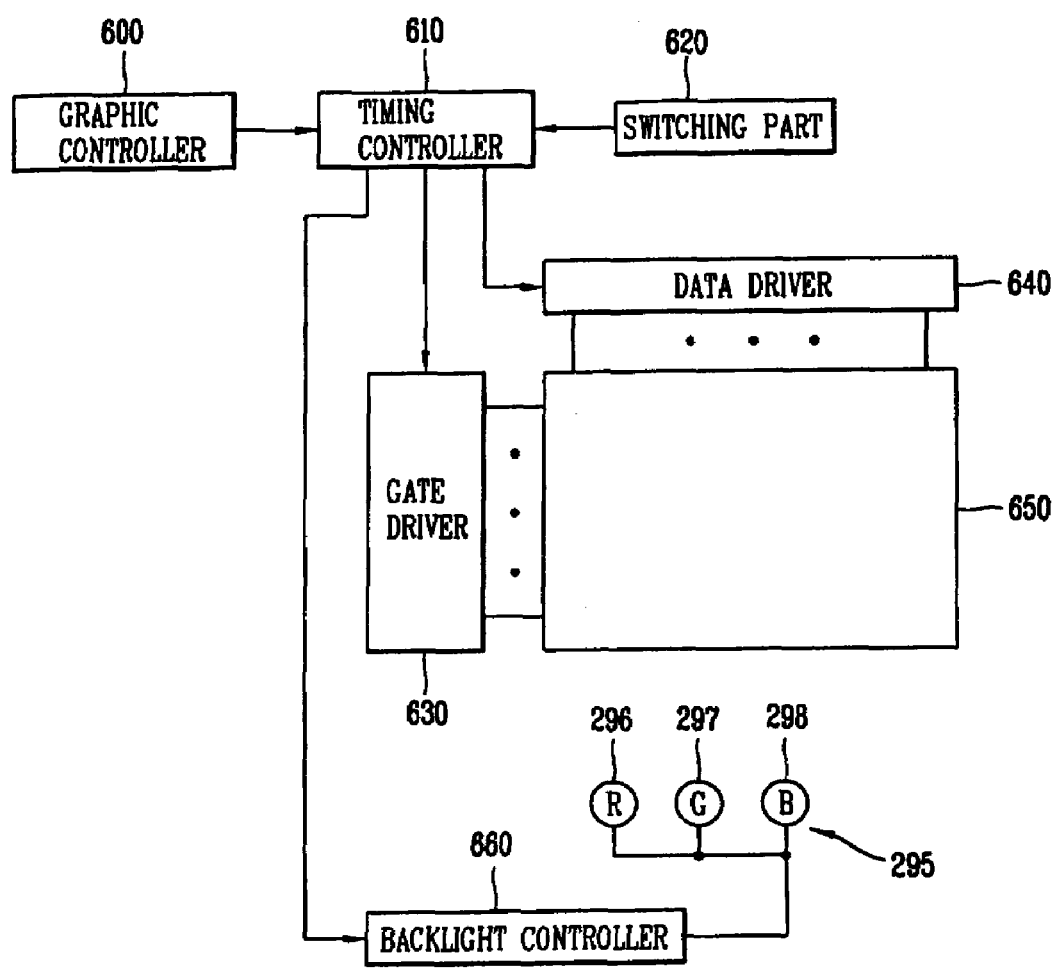
FIG. 5 is a block diagram of a driving circuit in trans-reflective liquid crystal display device according to the present invention.

FIG. 5 is a block diagram of a driving circuit of trans-reflective liquid crystal display device according to the present invention.

As shown in FIG. 5, the liquid crystal display device of this invention includes: a timing controller 610 that receives image data from a graphic controller 600 such as a computer to convert the image data and to output the converted image data; a switching unit 620 connected to the timing controller 610 that selects the output signal from the timing controller 610 according to the transmission mode or reflection mode; a gate driver 630 that receives the gate signal from the timing controller 610; a data driver 640 that receives the data signal from the timing controller 610; the liquid crystal display device panel 650 that displays the image by applying the gate and data signals from the gate driver 630 and the data driver 640 which are attached thereto; the sequential backlight 295 including the red lamp 296, the green lamp 297, and the blue lamp 298, wherein the red, green, and blue lamps 296-298 transmit light having R, G, B color in a predetermined order to transmit the light through the transmission region of the each pixel in the transmission mode and turned off in the reflection mode; a backlight controller 660 connected between the timing controller 610 and the sequential backlight 295 to control the timing of the sequential backlight.

The data signal from the timing controller 610 may include a control signal such as a source shift clock (SSC), a source output enable (SOE), and a polarity reversal signal (GSP), and the gate signal may include a control signal such as a gate start pulse (GSP), a gate shift clock (GSC), and a gate output enable (GOE).

The data signal is sampled by the data driver 640 according to a control signal from the timing controller 610 and latched into a line unit to convert the sampled data into the gamma voltage.

The gate driver 630 includes a shift resister that generates the gate pulse according to the gate start pulse (GSP) of the gate signals from the timing controller 610 and a level shifter that shifts the gate pulse voltage to a suitable operating voltage level of the liquid crystal cell.

When the trans-reflective liquid crystal display device is operated by the switching unit 620 in the reflection mode, the gate signal and data signal for the refection mode are generated by the timing controller 610 and then provided to the gate driver 630 and the data driver 640. At this time, the sequential backlight 295 and the MUX circuit 670 are turned off.

By applying the gate signal to the gate driver 630, the gate driver 630 applies a gate pulse of 60 Hz to the gate line in the liquid crystal display panel 650 in a time interval of 16.7 ms to turn on the TFT connected to the gate line. When the data signal is applied to each pixel from the data driver 640, the transmission ratio of the liquid crystal layer may be controlled and the light incident from outside the liquid crystal display panel 650 passes through the color filter, and thereby the color is realized.

When the trans-reflective liquid crystal display device is operated in the transmission mode, the timing controller 610 generates the gate signal and the data signal for the transmission mode to apply the generated gate and data signals to the gate driver 630 and data driver 640. At this time, the sequential backlight and the MUX circuit may be turned on.

The timing controller 610 divides the one frame into the three sub-frames of red, green, and blue and applies the control signal to the gate driver 630 and data driver 640. The driving method which divides the one frame into three-sub frames to operate the LCD panel is called a field sequential driving method. When the liquid crystal display device is operated at a predetermined frequency of 60 Hz, one frame is 16.7 ms, and thus, the sub-frame is one third of the one frame, i.e., about 5.5 ms.

The image data provided from the graphic controller is rearranged into red, green, and blue groups by the timing controller 610. The rearranged image data is supplied to the data driver 640. Further, the timing controller 610 generates the gate and data signals having a frequency suitable for the field sequential driving method.

In addition, when all the data to the liquid crystal cell has been supplied, the timing controller 610 controls backlight controller 660 to drive sequentially the red lamp 296, the green lamp 297 and the blue lamp 208.

Responding to the gate signal, at this time, the gate driver 630 applies sequentially a gate pulse of 180 Hz to the gate line in a time interval of about 5.5 ms. In the transmission mode, because the data signal of R, G, B colors is sequentially applied to the data line, the driving speed of the gate driver 630 is three times faster than that in the reflection mode which displays 60 frames per second. In addition, when the data signal of R, G, B colors is sequentially applied to the data line, the lamp 296, 297, and 298 corresponding to the R, G, B data signal of the sequential backlight 295 may be turned on. The on/off operation of each sequential backlight lamp is controlled by the backlight controller 660.

In this invention, as described above, R, G, B lamps are used for displaying the image in the transmission mode. Thus, this invention has some advantages as follow.

First, because LEDs having high color purity and high brightness are used as the backlight in the transmission mode, it is possible to remove the color filter layer in the transmission region. Accordingly, the decrease in transmission ratio in the transmission mode may be prevented.

Second, it is possible to obtain a uniform brightness throughout the liquid crystal panel because of the high brightness of the LED in the case where the area of the transmission region is smaller than that of the reflection region. Thus, the area of the reflection region may be increased and as a result the brightness in the reflection mode may be improved.

Third, the fabrication process of the color filter substrate may be simplified because of the simplified patterning process of the color filter layer.

Fourth, because the LEDs are used as the backlight, the color reproducibility may be improved.

It will be apparent to those skilled in the art that various modifications and variation can be made in the present invention without departing from the spirit or scope of the invention. Thus, it is intended that the present invention provided they come within the scope of the appended claims and their equivalents.

What is claimed is:

1. A trans-reflective liquid crystal display device comprising:
    a timing controller that receives, converts, and outputs image data;
    a switching unit that determines the output signal of the timing controller according to a transmission mode or reflection mode;
    a gate driver that receives a gate signal from the timing controller;
    a data driver that receives a data signal from the timing controller;
    a liquid crystal display panel with a TFT array substrate having a plurality of data and gate lines defining a plurality of pixels, a color filter substrate and a liquid crystal layer interposed therebetween, and having the pixels having a reflection region and a transmission region, wherein an area of the transmission region is smaller than that of the reflection region to obtain an uniform brightness throughout the liquid crystal display by the high brightness of red, green, and blue emitting diodes, wherein the liquid crystal display panel comprising a TFT formed on the TFT array substrate; an organic layer formed on the TFT array substrate including the TFT; a transmission hole formed in the organic layer and having a slanted side profile; a reflection electrode formed on an upper surface of the organic layer including the slanted side of the transmission hole; a passivation layer formed on the reflection electrode and the transmission hole; a pixel electrode formed on the passivation layer and connected to the TFT; a black matrix formed on the color filter substrate; color filter layers formed on portions of the color filter substrate corresponding to the reflection region except for the transmission region; and a common electrode formed on the black matrix, the color filters and a portion of the color filter substrate corresponding to the transmission region, wherein the liquid crystal display panel displaying image data according to a gate pulse and a data voltage applied by the gate driver and the data driver;
    a sequential backlight including the red, green, and blue emitting diodes, wherein the backlight is turned on in a transmission mode to sequentially transmit light into the transmission region, wherein the light emitted from the backlight is transmitted through the TFT array substrate, the liquid crystal layer and the color filter substrate corresponding to the transmission region and is turned off in a reflection mode, wherein the backlight is disposed under the TFT array substrate; and a backlight controller connected to the sequential backlight to control the timing of light emissions in the transmission mode.

2. The trans-reflective liquid crystal display device of claim 1, wherein the color filter substrate includes a color filter formed in the reflection region.

3. The trans-reflective liquid crystal display device of claim 1, wherein the data driver includes a MUX circuit shorting three adjacent data lines, the MUX circuit being turned on in the transmission mode and turned off in the reflection mode.

4. The trans-reflective liquid crystal display device of claim 1, wherein the cell gap in the transmission region is twice that in the reflection region.

5. The trans-reflective liquid crystal display device of claim 1, wherein the timing controller divides one frame of display data into three sub-frames.

6. A method of driving a trans-reflective liquid crystal display device having a plurality of pixels defined by a plurality of data and gate lines arranged in the transverse and longitudinal directions, the pixels having a transmission region and a reflection region, the method comprising the steps of:

supplying image data to a timing controller;

selecting a transmission mode or a reflection mode by a switching unit;

converting and outputting the image data by the timing controller;

displaying image through a liquid crystal panel by applying gate and data signals from a gate driver and a data driver, wherein the liquid crystal display panel includes a TFT array substrate, a color filter substrate and a liquid crystal layer interposed therebetween, and has the pixels having the transmission region and the reflection region, wherein an area of the transmission region is smaller than that of the reflection region to obtain an uniform brightness throughout the liquid crystal display by the high brightness of red, green, and blue emitting diodes;

wherein the liquid crystal display panel comprising a TFT on the TFT array substrate; an organic layer on the TFT array substrate including the TFT; a transmission hole in the organic layer and having a slanted side profile; a reflection electrode on an upper surface of the organic layer including the slanted side profile of the transmission hole; a passivation layer on the reflection electrode and the transmission hole; a pixel electrode on the passivation layer and connected to the TFT; a black matrix on the color filter substrate; color filter layers on portions of the color filter substrate corresponding to the reflection region except for the transmission region and a common electrode formed on the black matrix, the color filters and a portion of the color filter substrate corresponding to the transmission region;

transmitting external light through a color layer to display a color image in the reflection mode and operating the backlight having red, green, and blue emitting diodes to display the color image in the transmission mode, the backlight sequentially emitting lights having red, green, and blue colors in the transmission region of the pixel, wherein the backlight is disposed under the liquid crystal display panel, and the light emitted from the backlight is transmitted through the TFT array substrate, the liquid crystal layer and the color filter substrate corresponding to the transmission region;

dividing one frame into three sub-frames to transmit sequentially light having red, green, and blue colors in the transmission mode; and applying the same data voltage to the adjacent three pixels every sub frame in the transmission mode; and applying independent data voltages to each pixel in the reflection mode.

7. The method of claim 6, wherein the light from the backlight does not pass through a color layer.

8. A liquid crystal display device, comprising:

a liquid crystal panel having a plurality of pixels defined by a plurality of gate and data lines arranged on a first substrate, the pixels having a reflection region and a transmission region, wherein an area of the transmission region is smaller than that of the reflection region to obtain an uniform brightness throughout the liquid crystal display by the high brightness of red, green, and blue emitting diodes;

a switching device in each pixel;

an organic layer formed on the first substrate including the switching device;

a transmission hole formed in the organic layer and having a slanted side profile;

a reflective electrode in the reflection region to reflect light incident from outside the liquid crystal panel, wherein the reflection electrode is formed on an upper surface of the organic layer including the slanted side of the transmission hole;

a passivation layer formed on the reflection electrode and the transmission hole;

a pixel electrode formed on the passivation layer and connected to the switching device;

a black matrix formed on the second substrate;

color filter layers formed on portions of the second substrate corresponding to the reflection region except for the transmission region;

a common electrode formed on the black matrix, the color filters and a portion of the second substrate corresponding to the transmission region, a liquid crystal layer between the first substrate and the second substrate;

a backlight including the red, green, and blue light emitting diodes, wherein the light emitting diodes sequentially emitting light in the transmission region, wherein the backlight is disposed under the first substrate, and the light emitted from the backlight is transmitted through the TFT array substrate, the liquid crystal layer and the second substrate corresponding to the transmission region;

a timing controller that receives, converts, and outputs image data;

a switching unit that determines the output signal of the timing controller according to a transmission mode or a reflection mode;

a backlight controller that controls the backlight based upon the output of the timing controller; and a MUX circuit shorting out three adjacent data lines, wherein the MUX circuit is turned on in a transmission mode and turned off in a reflection mode.

9. The liquid crystal display device of claim 8, wherein the liquid crystal panel includes:

a second substrate; and a liquid crystal layer between the first and second substrate.

10. The liquid crystal display device of claim 8, wherein the switching device includes a thin film transistor.

11. The liquid crystal display device of claim 8, wherein the cell gap between the substrates in the transmission region is twice the cell gap in the reflection region.

12. The liquid crystal display device of claim 8, further comprising a gate driver connected to the gate lines and a data driver connected to the data lines.

13. The trans-reflective liquid crystal display of claim 8, wherein the light from the backlight passes through the color filter substrate unfiltered.

14. The liquid crystal display device of claim 8, wherein color layer is only in the reflective region.

15. A trans-reflective liquid crystal display device comprising:
   a plurality of data and gate lines defining a plurality of pixels, the pixels having a reflection region and a transmission region, wherein an area of the transmission region is smaller than that of the reflection region to obtain an uniform brightness throughout the liquid crystal display by the high brightness of red, green, and blue emitting diodes;
   a timing controller that receives, converts, and outputs image data, wherein the timing controller divides one frame of display data into three sub-frames;
   a switching unit that determines the output signal of the timing controller according to a transmission mode or reflection mode;
   a gate driver that receives a gate signal from the timing controller;
   a data driver that receives a data signal from the timing controller, wherein the data driver includes a MUX circuit shorting three adjacent data lines, the MUX circuit being turned on in the transmission mode and turned off in the reflection mode;
   a liquid crystal display panel with a TFT array substrate, a color filter substrate and a liquid crystal layer interposed therebetween, wherein the liquid crystal display panel comprising a TFT formed on the TFT array substrate; an organic layer formed on the TFT array substrate including the TFT; a transmission hole formed in the organic layer and having a slanted side profile; a reflection electrode formed on an upper surface of the organic layer including the slanted side of the transmission hole; a passivation layer formed on the reflection electrode and the transmission hole; a pixel electrode formed on the passivation layer and connected to the TFT; a black matrix formed on the color filter substrate; color filter layers formed on portions of the color filter substrate corresponding to the reflection region except for the transmission region, a common electrode formed on the black matrix, the color filters and a portion of the color filter substrate corresponding to the transmission region, wherein the liquid crystal display panel displaying image data according to a gate pulse and a data voltage applied by the gate driver and the data driver;
   a sequential backlight including the red, green, and blue emitting diodes, wherein the backlight is turned on in a transmission mode to sequentially transmit light into the transmission region and is turned off in a reflection mode, wherein the backlight is disposed under the TFT array substrate and includes a light emitting diode, and the light emitted from the backlight is transmitted through the TFT array substrate, the liquid crystal layer and the color filter substrate corresponding to the transmission region; and
   a backlight controller connected to the sequential backlight to control the timing of light emissions in the transmission mode.

16. A liquid crystal display device, comprising:
   a liquid crystal panel having a plurality of pixels defined by a plurality of gate and data lines arranged on a first substrate, the pixels having a reflection region and a transmission region, wherein an area of the transmission region is smaller than that of the reflection region to obtain an uniform brightness throughout the liquid crystal display by the high brightness of red, green, and blue emitting diodes, wherein the liquid crystal panel includes: a second substrate; and a liquid crystal layer between the first and second substrate, wherein the cell gap between the substrates in the transmission region is twice the cell gap in the reflection region;
   a switching device in each pixel, wherein the switching device includes a thin film transistor;
   an organic layer formed on the first substrate including the switching device;
   a transmission hole formed in the organic layer and having a slanted side profile;
   a reflective electrode in the reflection region to reflect light incident from outside the liquid crystal panel, wherein the reflection electrode formed on an upper surface of the organic layer including the slanted side of the transmission hole;
   a passivation layer formed on the reflection electrode and the transmission hole;
   a pixel electrode formed on the passivation layer and connected to the switching device;
   a black matrix formed on the second substrate;
   color filter layers formed on portions of the second substrate corresponding to the reflection region except for the transmission region;
   a common electrode formed on the black matrix, the color filters and a portion of the second substrate corresponding to the transmission region;
   a liquid crystal layer between the first substrate and the second substrate;
   a backlight including the red, green, and blue light emitting diodes, wherein the light emitting diodes sequentially emitting light in the transmission region, wherein the backlight is disposed under the first substrate, and the light emitted from the backlight is transmitted through the TFT array substrate, the liquid crystal layer and the second substrate corresponding to the transmission region;
   a timing controller that receives, converts, and outputs image data;
   a switching unit that determines the output signal of the timing controller according to a transmission mode or a reflection mode; and
   a backlight controller that controls the backlight based upon the output of the timing controller.

* * * * *